July 2, 1957    E. P. ERIKSEN    2,797,517
BAIT SAVING FISH LURE
Filed June 30, 1954
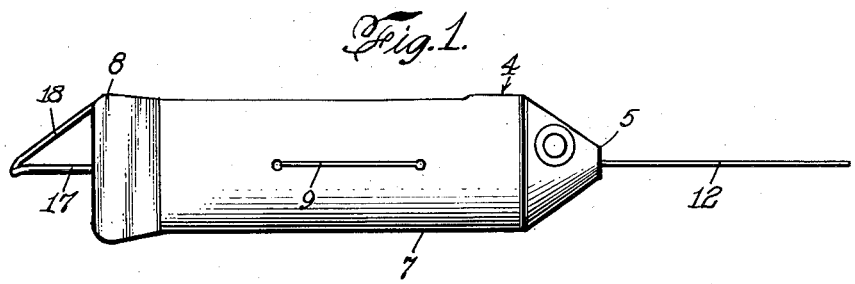
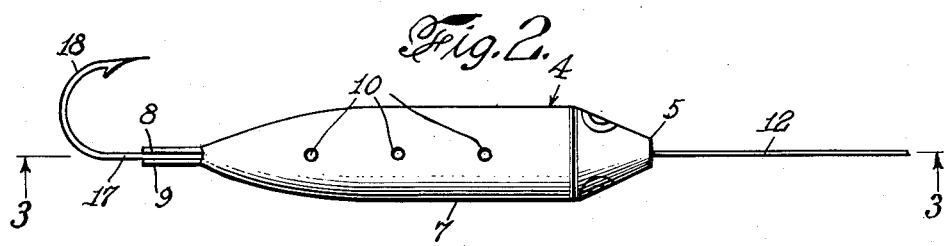
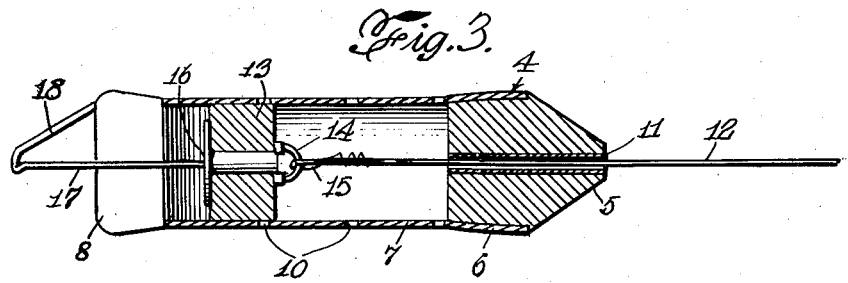
INVENTOR.
EDVIN PEDER ERIKSEN
BY
ATTORNEY United States Patent Office 2,797,517
Patented July 2, 1957

2,797,517

BAIT SAVING FISH LURE

Edvin Peder Eriksen, Rio Vista, Calif.

Application June 30, 1954, Serial No. 440,440

1 Claim. (Cl. 43—42.06)

The present invention relates to fish lures, and particularly to a special bait saving fish lure.

The main object of my invention is to provide a novel fish lure capable of containing fish bait in such manner as to economize on bait and yet catch fish in effective manner.

An ancillary object is to provide a special fish lure that is hollow for containing the bait within the outline of the same and actually out of reach of the fish in the water.

Another object of the invention is to have a special type of fish lure having a fish hook, to be sure, but which independently carries a supply of bait that is not in contact with the hook.

A further object of this invention is to provide a fish lure with a trailing fish hook occupying an unobtrusive yet effective position for catching a fish and having an internal bait retaining chamber for concealing the bait in largely protected manner so as to be effective to attract the fish into sufficiently close position to the lure to be caught by its hook.

Another ancillary object is to have such a hollow fish lure that is pierced by at least one side slot or slit for inserting and concealing the bait within the lure, and having one or more holes in the sides through which the fish will readily detect the bait and be so attracted thereby as to disregard the hook and be caught.

It is, of course a desirable object to have a fish lure of the character indicated which is easily made of rubber, plastic or on occasion of any other suitable material, as may be desired, and of various colors that appeal to fish.

A practical object is likewise to produce such a hollow bait saving fish lure in a simple, yet effective form, and at such reasonable cost that will encourage wide distribution on the sports market.

Other objects and advantages of my invention will appear more fully in detail as the specification proceeds.

In order to facilitate ready comprehension of this invention for a proper appreciation of the salient features of the same, the invention is illustrated on the accompanying drawing forming part hereof, and in which:

Figure 1 is a side elevation of a bait saving fish lure made according to the principles of my invention and embodying the same in a practical form;

Figure 2 is a top or plan view of the same lure as seen from above in Figure 1; and Figure 3 is a horizontal sectional view of the fish lure of Figure 2 taken on line 3—3 in Fig. 2.

In these views, the same reference numerals indicate the same parts and features.

Hence, in the practice of my invention, and referring also again to the drawing, the fish lure primarily includes a hollow lure body generally indicated at 4 having a frusto-conical end block 5 with a reduced portion 6 upon which one end of a tubular element 7 fits closely and is fixed in place. The mentioned tubular element 7 at the other end is flattened to simulate a fish tail 8 and is preferably made of rubber, plastic or the like, and has a pair of opposite longitudinal slits 9 (one shown) and a plurality of holes or perforations 10, 10, etc., for exposing bait within the lure to a limited extent.

Through the end block or head 5 is an axial hole 11 into which a fish line 12 extends from the exterior of the lure. Within the other tail end, the lure contains a second block 13 through which an anchoring fixture 16 extends with a loop 14 to which the fish line 12 is secured at 15. From the outer end of this fixture extends a fish hook 17 through the tail end 8. Beyond this end, the hook presents its curved working end 18.

The arrangement is such that when the lure is to be used, bait is inserted into its interior through a side slit 9, and the slit then allowed to close upon the inserted bait. If necessary to make room for the bait, the lure may be seized in one hand and the hook 18 carefully pulled free of tail end 8 so that block 13 is drawn toward the tail end to increase the space between the two blocks 5 and 13. Upon submerging the lure, the same is naturally suspended from line 12, and the fish in the water are soon aware of the bait within the lure body 4 and approach it to nibble or actually bite it, when a pull on line 12 will impart a pull to the block 13 and hook 17, 18, thereby catching the fish that was intent on the lure body and its bait. If the pull is sufficiently vigorous, the block 13 will move toward block 5, bringing hook 18 nearer to end 8 and thus catching into the fish close to the lure. Thus, the hidden bait is quite as effective to lure the fish into range of the hook as though actually exposed for direct nibbling and biting upon it by the fish.

The lure may be made in several sizes and likewise the hook, according to the size and kind of fish it is intended to catch, and the lure may also be of various lengths, as desired.

Manifestly, variations may be resorted to, and parts and features may be modified or used without others within the scope of the appended claim.

Having now fully described my invention, I claim:

A fish lure consisting of a lure body having a frusto-conical front section simulating a fish head, said section having a passage therethrough; a rear section flattened at its extremity to simulate a fish tail and, having a passage therethrough and a hollow tubular central section composed of a resilient material, said section having a block slidably mounted therein and slidably engaging the inner walls of said central section, the adjustable space in said section between said rear body section and block serving to receive bait therein, said tubular section having slits in the side thereof to permit insertion of bait therein; said tubular section having a plurality of apertures therein to enable fish to scent said bait; a fish hook movably associated with said slidable block at one end thereof and extending out through the passage in said rear body section and able to move longitudinally with respect thereto; and a fish line extending into said lure body through the passage in said front end thereof and secured to the slidable block therein.

References Cited in the file of this patent

UNITED STATES PATENTS

| | | |
|---|---|---|
| 1,816,725 | Freeman | July 28, 1931 |
| 2,172,889 | Niemi | Sept. 12, 1939 |
| 2,288,009 | Matasy et al. | June 30, 1942 |
| 2,532,879 | Baker | Dec. 5, 1950 |
| 2,556,702 | Nielsen | June 12, 1951 |
| 2,614,358 | Adams | Oct. 21, 1952 |

FOREIGN PATENTS

| | | |
|---|---|---|
| 111,657 | Great Britain | June 13, 1918 |